Patented Apr. 21, 1936

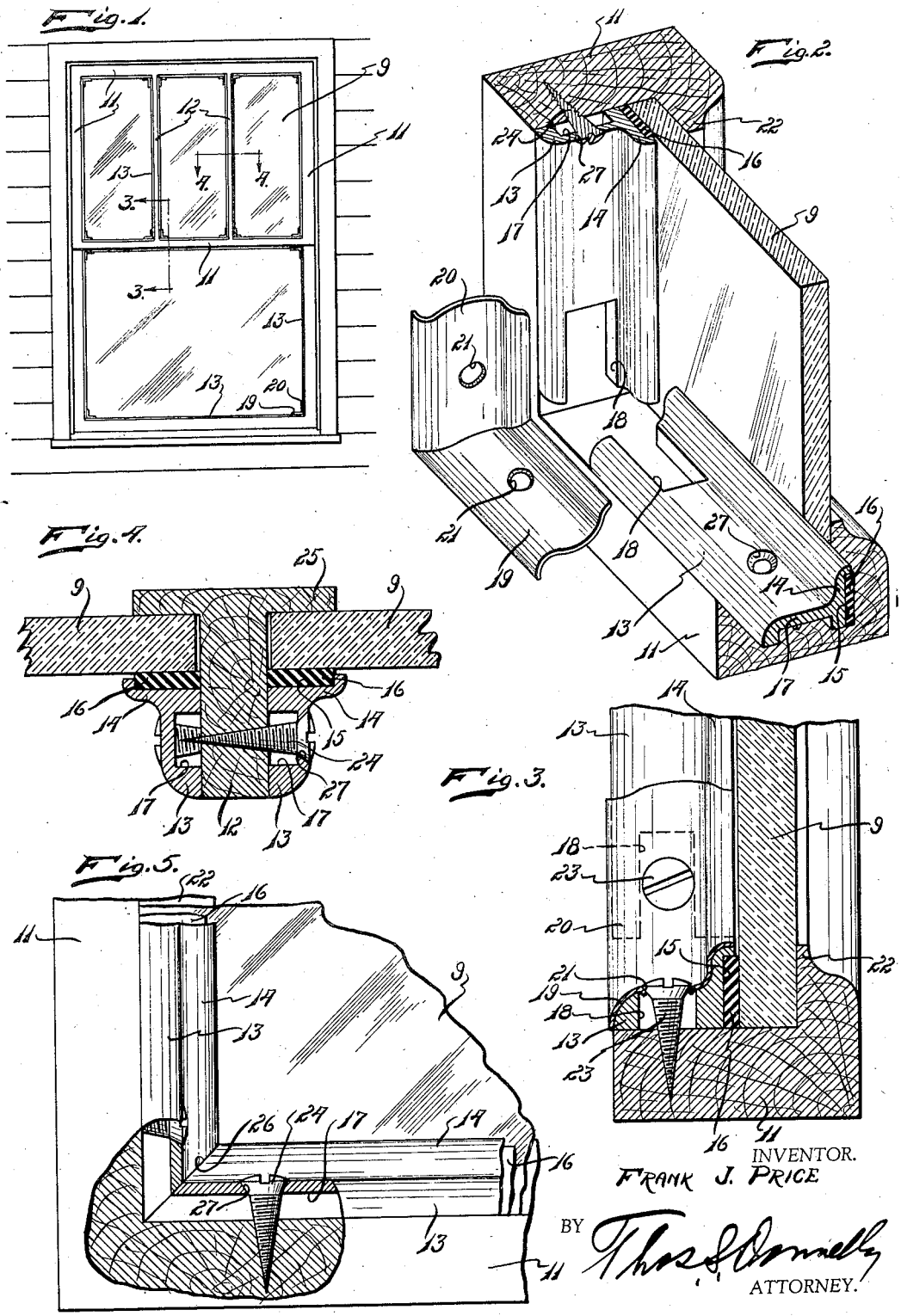

2,038,382

UNITED STATES PATENT OFFICE 2,038,382

WINDOW MOLDING

Frank J. Price, Detroit, Mich.

Application December 18, 1933, Serial No. 702,845

1 Claim. (Cl. 20—56.4)

My invention relates to a new and useful improvement in a window molding, adapted for use in securing a pane of glass in a window frame and intended to supplant in such use putty, clips or wooden molding, the present invention being made from some non-rustable material such as metal or a composition.

It is an object of the present invention to provide a window molding of this class which may be easily and quickly applied and which, when applied, will serve to securely retain a window pane in its frame.

Another object of the invention is to provide a molding of this class which may be cut into strips of predetermined length and adapted for use with a corner piece which will permit the use of the strips in windows of different widths within certain dimensions.

Another object of the invention is the provision of a molding of this class so constructed and arranged that it may be secured along one of its sides to a window frame rail, and provide on its side adjacent the rail, a space for the clearance of obstructions.

Another object of the invention is the provision of a window molding of this class which will be durable, light, and highly attractive in appearance.

Other objects will appear hereinafter.

The invention consists in the combination and arrangement of parts hereinafter described and claimed.

The invention will be best understood by reference to accompanying drawing which forms a part of this specification and in which, Fig. 1 is a front elevational view of a window showing the invention applied.

Fig. 2 is an enlarged fragmentary sectional view of the window showing the invention applied and illustrated in a perspective fragment.

Fig. 3 is an enlarged fragmentary sectional view taken on line 3—3 of Fig. 1.

Fig. 4 is an enlarged fragmentary sectional view taken on line 4—4 of Fig. 1.

Fig. 5 is an enlarged fragmentary elevational view showing a modified form of the invention applied with parts broken away and parts shown in section.

In the drawing I have illustrated the invention used on a window having panes 9 of glass mounted on a sash comprising the rails 11 and the partition rails 12.

The invention comprises a strip of material 13, which may be formed from any suitable material, but preferably non-rusting material and sufficient light for the purposes, such as aluminum, a fiber composition, or the like. This strip 13 is provided with the abutment flange 14 along one edge, which is recessed on its outer surface as at 15, and in which is positioned and suitably secured by glueing or the like, a strip 16 of yieldable material and of greater thickness than the depth of the recess 15. The strip 13 is recessed at one of its faces as at 17, so that it is substantially channel shaped in cross section. In the preferred form each of these strips is slotted at its end as at 18. The outer face or surface 15 which is referred to as a recessed surface is formed by cutting away the outer face of the upwardly projected flange so that there extends along this cut away face, at the upper edge, an overhanging ledge. It will also be noted that the face 15 extends at substantially right angles to the face in which the recess 17 is formed.

I provide for use with the strip a triangle shaped corner piece comprising the parts 19 and 20, and in each of which is formed an opening 21. These corner strips in cross section conform in contour to the outer surface of the strip 13.

In use the strips 13 are positioned on the rails 11 or the cross rails 12, as the case may be, with the yieldable strip 16, which is formed from felt, rubber, leather or the like, and in engagement with the surface of the glass pane 9. When the strip is pressed against the pane 9 so as to force the same closely against the shoulder or flange 22, the strip 13 may be nailed to the rail 11 by screws passed through the openings 27 formed in the strip 13. These strips are cut into predetermined lengths but there is a variation in the size of the window sashes amounting in some instances to one half inch or more variation. The portions 19 and 20 of the cornerpiece are of sufficient length to over lie the slotted portion 18. Screws 23 are projected through the openings 21 in the corner piece, and these screws will lie in the slots 18, so that the strips 13 may be moved longitudinally to proper position. The portions 19 and 20, therefore, of the corner-pieces which over lie the strips 13, serve to cooperate with these strips in compensating for the variation in the window widths which are encountered.

As shown clearly in Fig. 4, on different types of windows the dividing rails or partition members 12 are so narrow that the screws 24 which are used to secure the strips 13 in position, will extend through the members 12 against which the strips are positioned. Since the panes 9 of glass are positioned on opposite sides of the member 12 and held in engagement with the abutment flange 25, it is necessary that the strips 13 be located in engagement with opposite sides of the member 12. The recess 17 thus serves to accommodate the projecting ends of the screws 24 and form the necessary clearance therefor. It will also be noted that the screws 24 projected into the member 12 from opposite sides thereof are staggered. In Fig. 5, I have illustrated the strips 13 used without the cornerpiece in which the ends of the strip are cut on a bevel 26 and then butted together. This requires, however, a cutting tool on the job which is not required when the cornerpieces are used on strips delivered in predetermined lengths. With a window molding of this class a permanent structure is provided for securing the panes of glass in a window sash and a device which may easily and quickly be applied while at the same time an ornamental and attractive appearance is obtained. While I have illustrated and described the preferred forms of construction, I do not wish to limit myself to the precise details of structure shown, but desire to avail myself of such variations and modifications as come within the scope of the appended claim.

Having thus described my invention what I claim as new and desire to secure by Letters Patent is:

In combination with a window having a frame comprising side rails meeting at their ends in angular relation, and a pane of glass supported therein: a window molding comprising a strip of material having one of its faces longitudinally recessed to provide a structure substantially channel shaped in cross section and adapted for lying in engagement with the face of one of said rails; an upwardly projecting flange on the inner edge of said strip. The outer face of said flange extending at right angles to said recessed face and cut away to provide an overhanging ledge along the upper edge; a strip of yieldable material positioned on said last named face and engaging at one of its end edges the inner face of said ledge and lying against the face of the window pane, one end of said strip being inwardly slotted; and an L shaped corner piece overlying adjacent slotted ends of angularly extended strips and lying upon the outer surface of said strips and conforming to the contour thereof.

FRANK J. PRICE.